(12) United States Patent
Hayakawa et al.

(10) Patent No.: US 9,369,022 B2
(45) Date of Patent: Jun. 14, 2016

(54) ELECTRIC MOTOR AND FUEL PUMP USING THE SAME HAVING CIRCUMFERENTIAL HOLDING GROOVES FOR BEGINNING AND END PORTIONS OF COIL WINDINGS

(71) Applicant: DENSO CORPORATION, Kariya, Aichi-pref. (JP)

(72) Inventors: Tetsuo Hayakawa, Kariya (JP); Masaya Ootake, Kariya (JP); Kiyoshi Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 381 days.

(21) Appl. No.: 13/890,459

(22) Filed: May 9, 2013

(65) Prior Publication Data
US 2013/0315759 A1 Nov. 28, 2013

(30) Foreign Application Priority Data

May 22, 2012 (JP) .................................. 2012-116553
Oct. 17, 2012 (JP) .................................. 2012-229682

(51) Int. Cl.
*H02K 3/46* (2006.01)
*H02K 11/00* (2016.01)
(Continued)

(52) U.S. Cl.
CPC ................... *H02K 3/46* (2013.01); *H02K 3/345* (2013.01); *H02K 3/522* (2013.01); *H02K 3/28* (2013.01); *H02K 3/32* (2013.01); *H02K 3/34* (2013.01); *H02K 3/38* (2013.01); *H02K 3/52* (2013.01); *H02K 5/22* (2013.01); *H02K 5/225* (2013.01); *H02K 11/00* (2013.01); *H02K 11/0094* (2013.01); *H02K 13/04* (2013.01)

(58) Field of Classification Search
CPC ............. H02K 3/28; H02K 3/32; H02K 3/34; H02K 3/345; H02K 3/38; H02K 3/52; H02K 5/225; H02K 5/22; H02K 13/04; H02K 11/00; H02K 11/0094; H02K 17/032
USPC ........... 310/43, 71, 87, 88, 215, 216; 417/420
See application file for complete search history.

(56) References Cited

U.S. PATENT DOCUMENTS 6,967,421 B2 * 11/2005 Gomyo et al. ................. 310/180
7,418,948 B2 *  9/2008 Nagata ..................... H02K 5/12
                                                           123/497

(Continued)

FOREIGN PATENT DOCUMENTS

JP    08-223843    8/1996
JP    2013-070577   4/2013

OTHER PUBLICATIONS

Obata et al., English Translation of JP 2003-230243.*

(Continued)

*Primary Examiner* — Joshua Benitez Rosario
*Assistant Examiner* — Rashad Johnson
(74) *Attorney, Agent, or Firm* — Nixon & Vanderhye P.C.

(57) ABSTRACT

An electric motor has multiple core portions, multiple bobbins covering the respective core portions, and multiple coil windings wound on the respective core portions and bobbins. Each of the bobbins has a first and a second circumferential forward ends, at which a first and a second holding portions are formed. The first holding portion holds a winding-start portion and the second holding portion holds a winding-end portion. The winding-start portion is prevented from being brought into contact with the winding-end portion and main winding portion of the coil winding between the winding-start portion and the winding-end portion.

12 Claims, 8 Drawing Sheets

(51) Int. Cl.
*H02K 3/32* (2006.01)
*H02K 13/04* (2006.01)
*H02K 3/38* (2006.01)
*H02K 3/34* (2006.01)
*H02K 5/22* (2006.01)
*H02K 3/28* (2006.01)
*H02K 3/52* (2006.01)

(56) References Cited

U.S. PATENT DOCUMENTS

| | | | | |
|---|---|---|---|---|
| 2005/0206264 | A1* | 9/2005 | Yamamoto | H01R 39/32 310/216.001 |
| 2007/0103014 | A1 | 5/2007 | Sumiya et al. | |
| 2007/0114878 | A1* | 5/2007 | Tatebe | 310/259 |
| 2008/0024029 | A1* | 1/2008 | Shiono et al. | 310/194 |
| 2011/0020154 | A1* | 1/2011 | Matsuda et al. | 417/410.1 |
| 2012/0104902 | A1* | 5/2012 | Fukui et al. | 310/68 B |
| 2012/0286619 | A1* | 11/2012 | Tsuiki et al. | 310/215 |
| 2013/0249334 | A1* | 9/2013 | Kitta | H02K 3/522 310/71 |

OTHER PUBLICATIONS

U.S. Appl. No. 13/689,994, filed Nov. 30, 2012, Furuhashi et al.

Office Action (2 pages) dated Jul. 24, 2014 issued in corresponding Japanese Application No. 2012-229682 and English translation (3 pages).

* cited by examiner

FIG. 4B  COMPARISON EXAMPLE

ELECTRIC MOTOR AND FUEL PUMP USING THE SAME HAVING CIRCUMFERENTIAL HOLDING GROOVES FOR BEGINNING AND END PORTIONS OF COIL WINDINGS

CROSS REFERENCE TO RELATED APPLICATION

This application is based on Japanese Patent Application No. 2012-116553 filed on May 22, 2012 and No. 2012-229682 filed on Oct. 17, 2012, the disclosures of which are incorporated herein by reference.

FIELD OF TECHNOLOGY

The present disclosure relates to an electric motor and a fuel pump using the electric motor.

BACKGROUND

An electric motor is known in the art, according to which electric current supply to coil windings wound on bobbins of a stator is controlled so as to switch magnetic field in a continuous manner, to thereby rotate a rotor movably provided in a radial inside space of the stator. For example, according to an electric motor, as disclosed in Japanese Patent Publication No. 2007-129847, positioning portions are provided for positioning cross-over wires between different coil windings, which are respectively wound on different bobbins. According to such a structure, the cross-over wire is prevented from being brought into contact with the other cross-over wires and/or the coil windings.

In the above electric motor, however, a winding-start portion as well as a winding-end portion of each coil winding, to which the cross-over wires are respectively connected, is not positioned. Therefore, when winding the wire on the bobbins, the winding-start portion of the coil winding may interfere with the wire(s) at intermediate positions located between the winding-start portion and the winding-end portion. Then, the wire(s) of the coil winding may tumble down.

SUMMARY OF THE DISCLOSURE

The present disclosure is made in view of the above point. It is an object of the present disclosure to provide an electric motor, according to which a wire of a coil winding does not tumble down during a winding process of the wire to a bobbin.

According to a feature of the present disclosure, an electric motor has a stator and a rotor, wherein the stator has multiple core portions, multiple coil windings and multiple bobbins. A holding portion is formed in the bobbin for holding either a winding-start portion or a winding-end portion of the coil winding. The holding portion is formed at a circumferential forward end, which is formed at a radial inside portion of the bobbin.

According to the above feature, since either the winding-start portion or the winding-end portion of the coil winding is held by the holding portion of the bobbin, it is possible to prevent the winding-start portion or the winding-end portion from interfering with wire(s) of the coil winding which is wound on the bobbin between the winding-start portion and the winding-end portion. Then, it is possible to prevent an initial position of the winding-start portion from moving due to the interference between the winding-start portion and the wire of the coil winding at any intermediate positions. As a result, it is possible to prevent the wire of the coil winding from tumbling down during the winding process.

BRIEF DESCRIPTION OF THE DRAWINGS

The above and other objects, features and advantages of the present disclosure will become more apparent from the following detailed description made with reference to the accompanying drawings. In the drawings:

FIG. 4B is a schematic enlarged view showing a process for winding a wire on a bobbin for an electric motor of a comparison example;

DETAILED DESCRIPTION OF THE EMBODIMENTS

Figure 1:
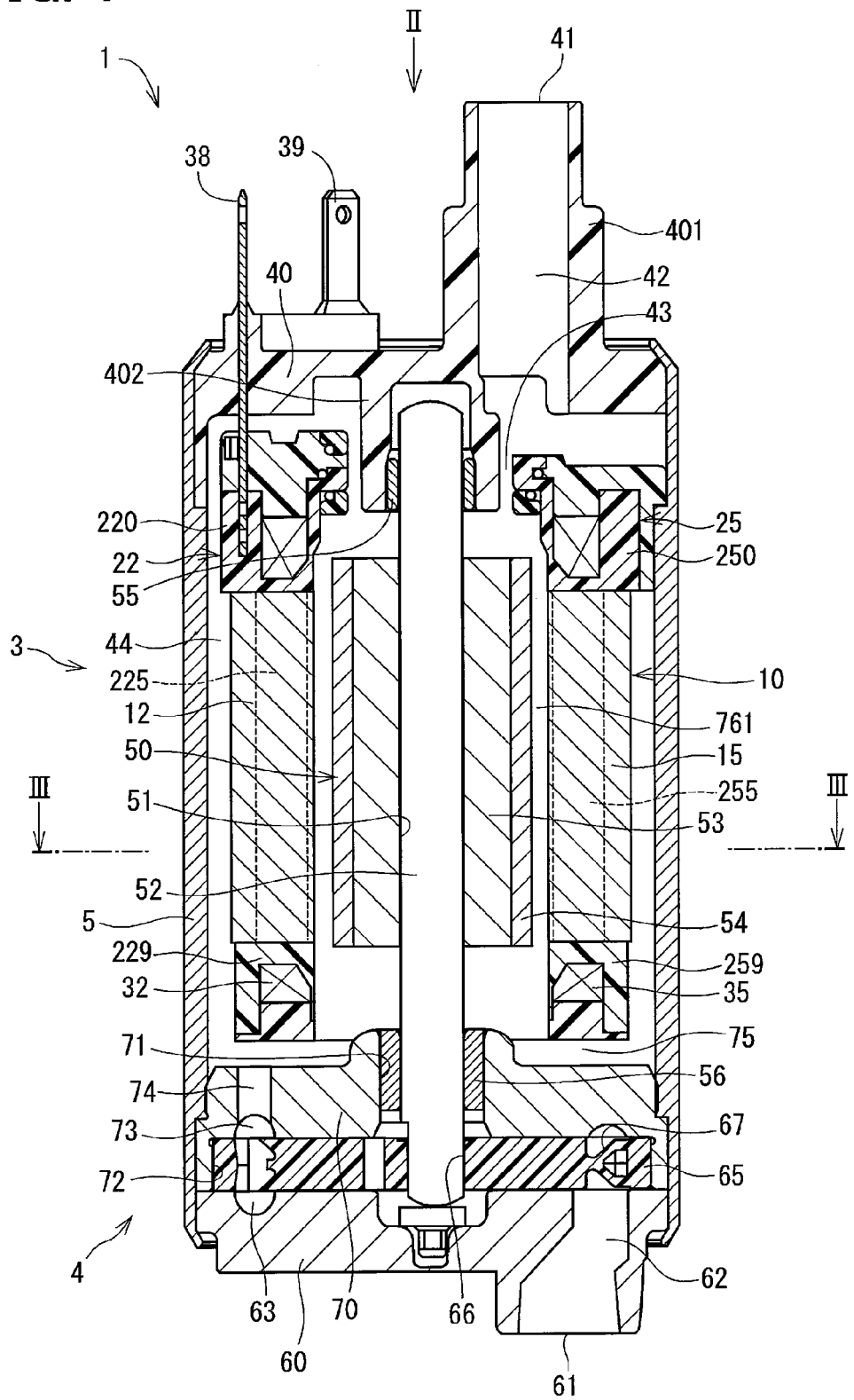
FIG. 1 is a schematic cross sectional view, taken along a line I-I in FIG. 2, showing a fuel pump using an electric motor according to a first embodiment of the present disclosure.

An electric motor and a fuel pump using the electric motor will be explained by way of multiple embodiments with reference to drawings. The same reference numerals are used throughout the embodiments for such parts and/or portions, which are the same or similar to each other.

A fuel pump having an electric motor of the present disclosure will be explained with reference to FIGS. 1 to 4B. A structure of the fuel pump will be explained at first with reference to FIGS. 1 to FIG. 3B.

The fuel pump 1 is composed of a motor portion 3, a pump portion 4, a housing 5, a pump cover 60, an end cover 40, and so on. The motor portion 3 and the pump portion 4 are accommodated in a space formed by the housing 5, the pump cover 60 and the end cover 40. The fuel pump 1 draws fuel from a fuel tank (not shown) via a fuel inlet port 61, which is formed at a lower side of the fuel pump 1, and pumps out pressurized fuel to an internal combustion engine (not shown) from a fuel outlet port 41, which is formed at an upper side of the fuel pump 1.

The housing 5 is made of metal (such as, iron) and formed in a cylindrical shape. The pump cover 60 is provided at the lower side of the housing 5, at which the fuel inlet port 61 is formed, so as to close the lower side of the housing 5. A lower end of the housing 5 is inwardly bent so that the pump cover 60 is firmly fixed to an inside of the housing 5. The pump cover 60 is therefore prevented from being pulled out from the housing 5.

The end cover 40 is made of resin and provided at the upper side of the housing 5, at which the fuel outlet port 41 is formed, so as to close the upper side of the housing 5. An upper end of the housing 5 is inwardly bent in order to firmly fix the end cover 40 to the housing 5. The end cover 40 is likewise prevented from being pulled out from the housing 5.

A tubular portion 401, which extends in an upward direction in FIG. 1, is formed at an outer side (an upper side) of the end cover 40. The fuel outlet port 41 is formed at a forward end of the tubular portion 401. A discharge passage 42 communicated to the fuel outlet port 41 is formed in the tubular portion 401. Another tubular portion 402, which extends in a downward direction in FIG. 1, that is, in a direction to a rotor 50, is formed at an inner side (a lower side) of the end cover 40. The other tubular portion 402 is formed at a center of the end cover 40. A bearing 55 is fitted into the other tubular portion 402.

The motor portion 3 is composed of a stator 10, the rotor 50, a shaft 52 and so on. The motor portion 3 is composed of a brushless electric motor 3. When electric power is supplied to the stator 10, a rotating magnetic field is generated so as to rotate the rotor 50 and the shaft 52 together.

The stator 10 is formed in a cylindrical shape and accommodated in a radial-outer space of the housing 5. The stator 10 has six core portions, six bobbins and six coil windings. The six core portions, the six bobbins and the six coil windings are integrally resin-molded so as to form the stator 10.

Each of the core portions 11, 12, 13, 14, 15 and 16 is made of multiple metal plates (made of magnetic material, such as, iron), which are laminated in an axial direction of the motor portion 3. Each of the core portions 11 to 16 is arranged at a position opposing to a permanent magnet 54 of the rotor 50.

Each of the core portions 11 to 16 has an outer flange portion 111, 121, 131, 141, 151 and 161, an inner flange portion 113, 123, 133, 143, 153 and 163 and a connecting portion 112, 122, 132, 142, 152 and 162 for connecting the outer and the inner flange portions to each other. Each of the outer flange portions (111, 121, 131, 141, 151, 161) is formed at an outer-most position of the connecting portion (112, 122, 132, 142, 152, 162) in a radial direction and extends in a circumferential direction of the stator 10. In a similar manner, each of the inner flange portions (113, 123, 133, 143, 153, 163) is formed at an inner-most position of the connecting portion (112, 122, 132, 142, 152, 162) in the radial direction and extends in the circumferential direction. Each of the connecting portions (112, 122, 132, 142, 152, 162) extends in the radial direction from a center of the inner flange portion (113, 123, 133, 143, 153, 163) to a center of the outer flange portion (111, 121, 131, 141, 151, 161).

Each of the bobbins 21 to 26 is made of resin and integrally formed with the respective core portion 11 to 16 by an insert-molding process. Each bobbin 21 to 26 has an upper end which is formed at a side of the fuel outlet port 41, an insert portion into which each core portion 11 to 16 is inserted, and a lower end which is formed at a side of the fuel inlet port 61. As shown in FIG. 1, the bobbin 22 has the upper end 220, the insert portion 225 and the lower 229. The bobbin 25 has the upper end 250, the insert portion 255 and the lower end 259. Although not shown in the drawings, each of the other bobbins 21, 23, 24 and 26 has the same structure.

Each of the insert portions is formed so as to cover a radial-inside wall surface of the outer flange portion (111-161) of the core portion (11 to 16), a circumferential side wall surface of the connecting portion (112-162) and a radial-outside wall surface of the inner flange portion (113-163). Each insert portion has a first winding space 114, 124, 134, 144, 154 and 164 and a second winding space 115, 125, 135, 145, 155 and 165, in which each coil winding 31, 32, 33, 34, 35 and 36 is wound. Each bobbin (21 to 26) insulates each coil winding (31 to 36) from each core portion (11 to 16). A more detailed structure of the bobbin (21 to 26) will be explained below.

Each of the coil windings 31 to 36, which is made of copper wire covered with insulating coating, is wound on the respective bobbin 21 to 26. More in detail, when viewed the bobbin from a center of the motor portion 3 in a radial outward direction, the copper wire passes from the lower end to the upper end of the bobbin (21 to 26) through the second winding space (115-165) and then passes from the upper end to the lower end of the bobbin (21 to 26) through the first winding space (114-164). In other words, each of the coil windings 31 to 36 is wound on the respective bobbin 21 to 26 in a clockwise direction. A process of winding the coil winding to the bobbin will be explained below more in detail.

Figure 2:
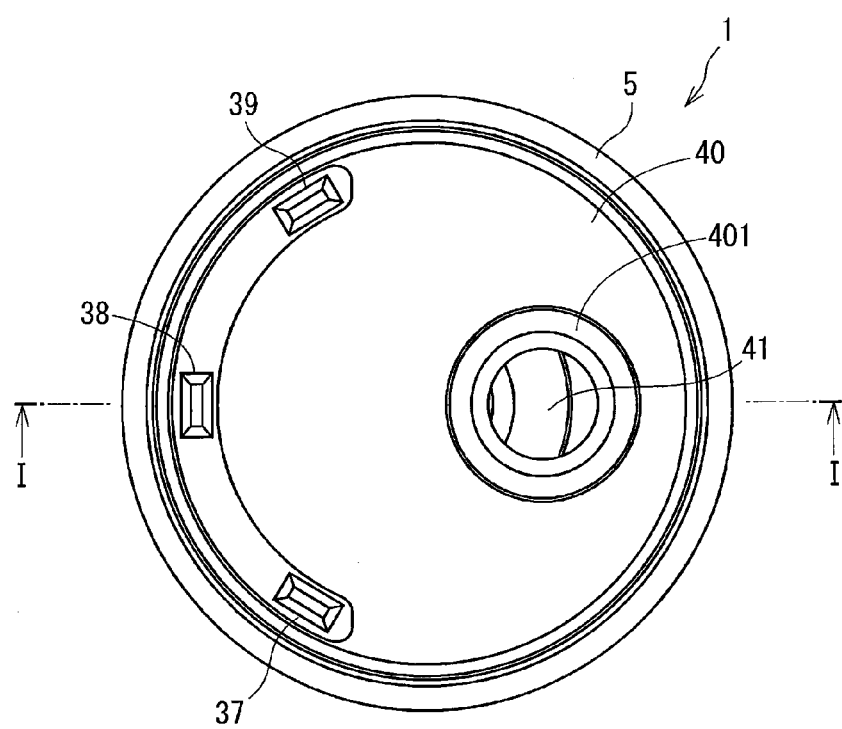
FIG. 2 is a schematic top plane view of the fuel pump when viewed in a direction of an arrow II in FIG. 1.

As shown in FIGS. 1 and 2, a W-phase terminal 37, a V-phase terminal 38 and a U-phase terminal 39 are provided in the end cover 40 at such portions, which do not interfere with the tubular portion 401, wherein each of the terminals 37, 38 and 39 is outwardly projected in the axial and upward direction. Three-phase electric current is supplied from an electric power source (not shown) to the respective terminals 37, 38 and 39.

In the first embodiment, three-phase connection of a stator coil of the stator 10 for generating magnetic circuit is formed in a delta connection. Two coil windings are provided in series between the terminals of the respective phase. For example, the coil winding 31 and the coil winding 34 are connected in series between the W-phase terminal 37 and the V-phase terminal 38 by a cross-over wire (not shown). In a similar manner, the coil winding 32 and the coil winding 35 are connected in series between the V-phase terminal 38 and the U-phase terminal 39 by a cross-over wire (not shown). The coil winding 33 and the coil winding 36 are connected in series between the U-phase terminal 39 and the W-phase terminal 37 by a cross-over wire (not shown). The cross-over wire is a wire made of the same material (the copper wire) to the coil windings 31 to 36, wherein the cross-over wire is not wound on the bobbin.

Figure 3A:
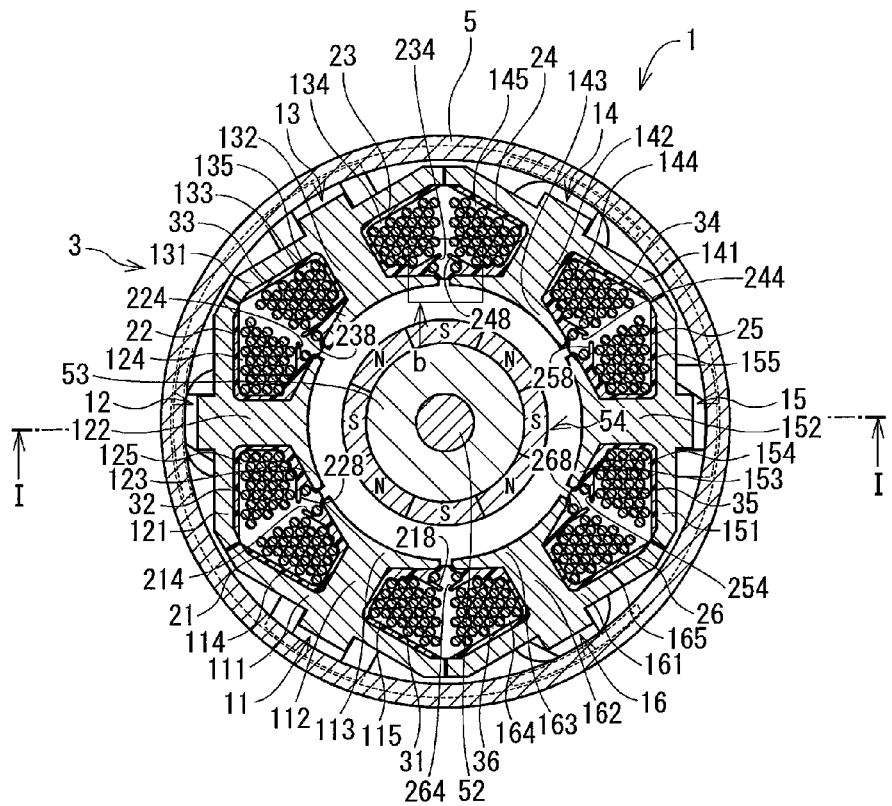
FIG. 3A is a schematic cross sectional view taken along a line III-III in FIG. 1.

The rotor 50 is rotatably accommodated in the inside of the stator 10. The magnet (the permanent magnet) 54 is provided at an outer periphery of an iron core 53 of the rotor 50. As shown in FIG. 3A, magnetic poles, that is, N-poles and S-poles, are alternately formed in a circumferential direction of the rotor 50. In the present embodiment, there are arranged with four N-poles and four S-poles (in total, eight magnetic poles). The shaft 52 is press-inserted into an axial bore 51 formed in the rotor 50, so that the rotor 50 and the shaft 52 are coaxially arranged and rotated together.

A structure of the pump portion 4 will be explained. The pump cover 60 has the fuel inlet port 61 of a tubular shape opening in a downward direction in FIG. 1. A suction passage 62 extending in a thickness direction of the pump cover 60 (that is, in the axial direction of the fuel pump 1) is formed in the fuel inlet port 61. A pump casing 70, which is formed in an almost disc shape, is provided between the pump cover 60 and the stator 10. A through-hole 71 extending in the thickness direction of the pump casing 70 is formed at a center of the pump casing 70. A bearing 56 is fitted into the through-hole 71. The bearing 56 and the bearing 55 fixed to the end cover 40 rotatably support both axial ends of the shaft 52. According to the above structure, the shaft 52 and the rotor 50 are rotatably supported by the end cover 40 and the pump casing 70.

An impeller 65 is made of resin and formed in a disc shape. The impeller 65 is accommodated in a pump chamber 72 formed between the pump cover 60 and the pump casing 70. A portion of a lower end of the shaft 52 is cut away to form a D-shaped cross section. The lower end of the shaft 52 is inserted into a coupling through-hole 66 of the impeller 65, wherein the through-hole 66 is formed at a center of the impeller 65 and formed in a D-letter shape. According to the above structure, the impeller 65 is rotated in the pump chamber 72 in accordance with the rotation of the shaft 52.

A groove 63, which is communicated to the suction passage 62, is formed on an inner wall surface of the pump cover 60, that is, an upper-side surface of the pump cover 60 facing to the impeller 65. A groove 73 is formed on an inner wall surface of the pump casing 70, that is, a lower-side surface of the pump casing 70 facing to the impeller 65. The groove 73 is communicated to a pump-out passage 74, which is formed in the pump casing 70 and extending in the thickness direction of the pump casing 70. Multiple blades 67 are formed at an outer peripheral portion of the impeller 65, so that the blades 67 are opposed to the grooves 63 and 73 in the axial direction of the fuel pump 1.

When the electric power (the three-phase electric current) is supplied to the coil windings 31 to 36 of the motor portion 3, the impeller 65 is rotated together with the shaft 52 and the rotor 50. Since the fuel pump 1 is located in a fuel tank (not shown) of a vehicle, when the impeller 65 is rotated, the fuel out of the fuel pump 1 is sucked into the groove 63 via the fuel inlet port 61. The fuel supplied to the groove 63 is pressurized by the rotation of the impeller 65 and supplied to the groove 73. The pressurized fuel is pumped out through the pump-out passage 74 and supplied into an intermediate chamber 75, that is, a lower-side space formed in the motor portion 3 on a side to the pump casing 70. The fuel supplied into the intermediate chamber 75 passes through an inside of the motor portion 3 (fuel passages formed in the motor portion 3) to the discharge passage 42, so that the fuel is discharged from the fuel outlet port 41.

In the present embodiment, two fuel passages are formed in the fuel pump 1. One of the fuel passages (a first fuel passage) is composed of a passage 761 between an outer wall surface of the rotor 50 and an inner wall surface of the stator 10, and a passage 43 between an outer wall surface of the tubular portion 402 of the end cover 40 and inner wall surfaces of the bobbins 21 to 26. A second fuel passage is composed of a passage 44 between an outer wall surface of the stator 10 and an inner wall surface of the housing 5.

Figure 3B:
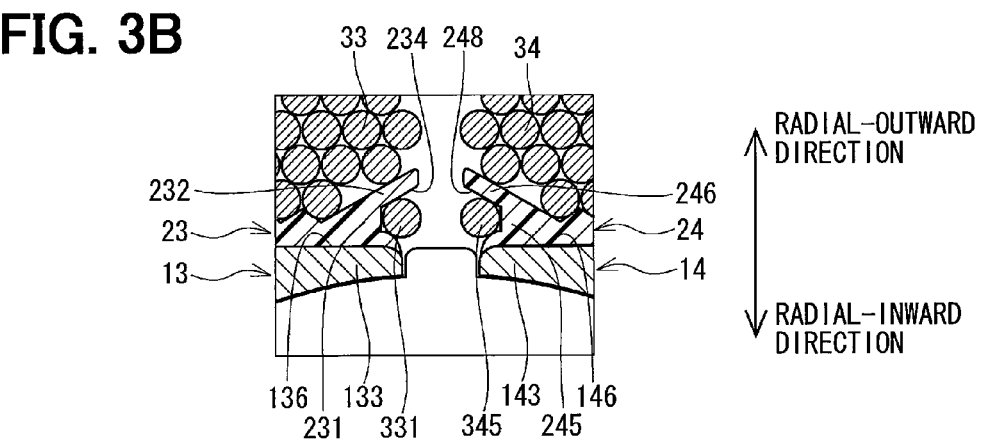
FIG. 3B is a schematic enlarged view showing a portion indicated by an arrow b in FIG. 3A.

A structure of the bobbins 21 to 26 will be explained with reference to FIGS. 3A and 3B. FIG. 3B is an enlarged view showing a portion b in FIG. 3A. As shown in FIG. 3B, the bobbin 23 covers the radial-outside wall surface 136 of the inner flange portion 133 of the core portion 13. A recessed portion is formed at a first circumferential forward end 231 of the bobbin 23, so as to form a first holding portion 234 for holding a winding-start portion 331 of the coil winding 33. The first holding portion 234 is formed in the bobbin 23 in such a way that the first holding portion 234 continuously extends in the axial direction of the fuel pump 1 from the upper end of the bobbin 23 (that is, on the side to the fuel outlet port 41) to the lower end of the bobbin 23 (that is, on the side to the fuel inlet port 61). Therefore, the first holding portion 234 axially extends in parallel to an axial center line of the fuel pump 1. An inner wall surface of the first holding portion 234 is formed in a tapered shape in its cross section. A first outside projection 232, which is formed at the first circumferential forward end 231 of the bobbin 23 so as to form a radial-outside inner wall of the recessed portion (that is, the first holding portion 234), is projected in the circumferential direction and in a direction away from the radial-outside wall surface 136 of the inner flange portion 133. The first outside projection 232 is also referred to as a first radial-outside projection.

In a similar manner, the bobbin 24 covers the radial-outside wall surface 146 of the inner flange portion 143 of the core portion 14. A recessed portion is likewise formed at a second circumferential forward end 245 of the bobbin 24, so as to form a second holding portion 248 for holding a winding-end portion 345 of the coil winding 34. The second holding portion 248 is formed in the bobbin 24 in such a way that the second holding portion 248 continuously extends in the axial direction of the fuel pump 1 from the upper end of the bobbin 24 (that is, on the side to the fuel outlet port 41) to the lower end of the bobbin 24 (that is, on the side to the fuel inlet port 61). Therefore, the second holding portion 248 axially extends in parallel to the axial center line of the fuel pump 1. An inner wall surface of the second holding portion 248 is formed in a tapered shape in its cross section. A second outside projection 246, which is formed at the second circumferential forward end 245 of the bobbin 24 so as to form a radial-outside inner wall of the recessed portion (that is, the second holding portion 248), is projected in the circumferential direction and in a direction away from the radial-outside wall surface 146 of the inner flange portion 143. The second outside projection 246 is also referred to as a second radial-outside projection.

Although only the structures of the bobbins 23 and 24, each of which respectively covers the core portions 13 and 14, are explained, each of the other bobbins 21, 22, 25 and 26 has the same structure to that of the bobbin 23 and 24. As shown in FIG. 3A, each of the bobbins 21, 22, 25 and 26 has a first holding portion 214, 224, 254 and 264 and a second holding portion 218, 228, 258 and 268.

Figure 4A:
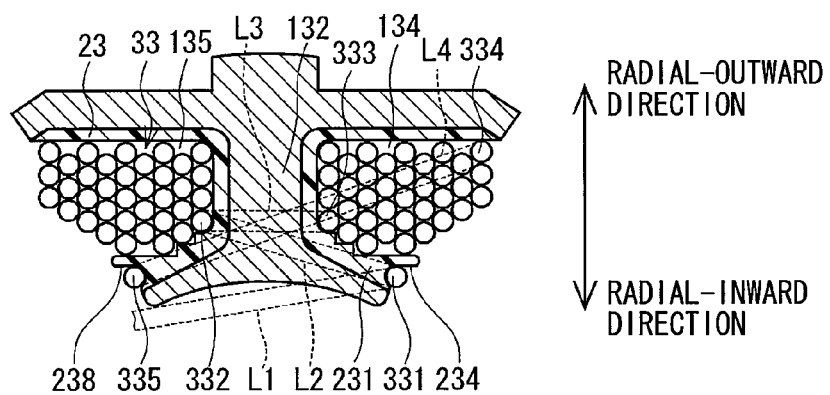
FIG. 4A is a schematic enlarged view showing a process for winging a wire on a bobbin for the electric motor of the first embodiment.
Figure 4A:
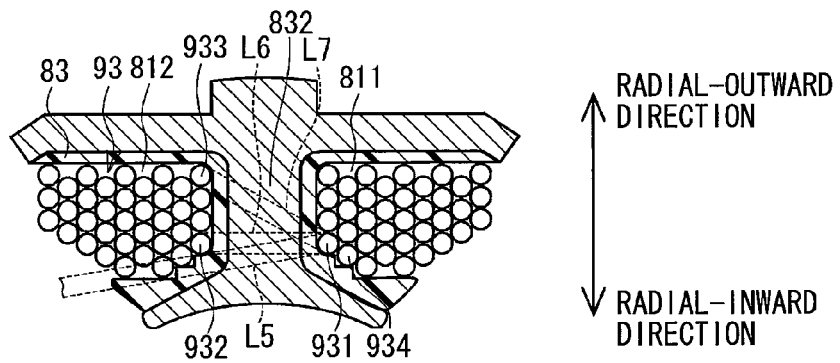

A process for winding the wire on the bobbin so as to form the coil winding will be explained with reference to FIG. 4A. Although only the process for winding the coil winding 33 on the bobbin 23 will be explained, the process for the other bobbins 21, 22, 24, 25 and 26 is the same to that for the bobbin 23. FIG. 4A is a cross sectional view showing the bobbin 23 and the coil winding 33. In FIG. 4A, dotted lines L1 to L4 respectively show positions of the wire to be wound on the bobbin 23.

When the wire for the coil winding 33 is wound on the bobbin 23, the winding-start portion 331 of the coil winding 33 is extended from a left-hand side in FIG. 4A as indicated by the dotted line L1 and the winding-start portion 331 is held by the first holding portion 234. The wire of the coil winding 33 is extended in the axial direction along the first holding portion 234. The wire of the coil winding 33 is then bent at the lower end of the bobbin 23 in the left-hand direction in FIG. 4A as indicated by the dotted line L2. Namely, the wire is bent at a back side of FIG. 4A in the left-hand direction toward the second winding space 135 and moved to an intermediate position 332.

The wire of the coil winding 33 is extended in the axial and upward direction from the intermediate position 322. The wire is then bent at the upper end of the bobbin 23 in a right-hand direction in FIG. 4A as indicated by the dotted line L3. Namely, the wire is bent at a front side of FIG. 4A in the right-hand direction from the second winding space 135 to the first winding space 134 and moved to another intermediate position 333. The wire of the coil winding 33 located at the intermediate position 333 of the first winding space 134 is not brought into contact with the wire of the winding-start portion 331 held by the first holding portion 234.

Then, the wire of the coil winding 33 is further extended in the downward direction toward the lower end of the bobbin 23, bent at the lower end to the second winding space 135, extended in the upward direction toward the upper end of the bobbin 23, and bent at the upper end of the bobbin 23 to the first winding space 134. The wire of the coil winding 33 is thus wound on the bobbin 23 by repeating the above winding process. The wire is wound on the bobbin in order from positions closer to the connecting portion 132 to positions away from the connecting portion 132. Namely, a first layer of the coil winding 33 is formed in the first and second winding spaces 134 and 135, wherein the first layer of the coil winding 33 is formed at a position closest to the connecting portion 132. In FIG. 4A, the first layer of the coil winding 33 is composed of four turns of the wire. Then, a second layer of the coil winding 33 is formed on the first layer. The second layer of the coil winding 33 is formed at a position, which is second closest to the connecting portion 132. The wire wound in the first and the second winding spaces 134 and 135, that is, the wire between the winding-start portion and the winding-end portion, is also referred to as a main winding portion.

The wire of the coil winding 33 is wound on the bobbin 23 alternately in the first winding space 134 and the second winding space 135. As indicated by the dotted line L4, an end of the wire for the coil winding 33 is extended from an intermediate position 334 toward the second holding portion 238 at the lower end of the bobbin 23, that is, at the back side of FIG. 4A. And the end of the wire, that is, the winding-end portion 335, is held by the second holding portion 238. The winding-end portion 335 held by the second holding portion 238 is not brought into contact with the main winding portion, that is, the wire of the coil winding 33 in the second wiring space 135.

As above, the winding-start portion 331 and the winding-end portion 335 of the coil winding 33 are not in contact with the main winding portion, including the wires located at the intermediate positions 332, 333 and 334.

A comparison example will be explained with reference to FIG. 4B, in which a structure corresponding to the first and second holding portions 234 and 238 is not formed in a bobbin. In such a case, a winding-start portion of a coil winding is brought into contact with a wire following the winding-start portion.

As indicated by a dotted line L5 in FIG. 4B, a winding-start portion 931 of a coil winding 93 is extended from a left-hand side of FIG. 4B. The winding-start portion 931 is wound on a bobbin 83 at a position, which is located at a radial-inside area in a first winding space 811 and closest to a connecting portion 832. The wire of the winding-start portion 931 is extended in an axial downward direction and bent at a lower end of the bobbin 83 (at a back side of FIG. 4B) in direction from the first winding space 811 to a second winding space 812 (to an intermediate position 932), as indicated by a dotted line L6 in FIG. 4B. A wire of the coil winding 93 is then alternately wound in the first winding space 811 and the second winding space 812. A first layer of the coil winding 93 is ended at an intermediate position 933 of the second winding space 812, and as indicated by a dotted line L7, the wire is further extended from the intermediate position 933 to an intermediate position 934 of a second layer in the first winding space 811. In this winding process, the wire of the coil winding 93 is brought into contact with the winding-start portion 931, which is already wound in the first winding space 811. As a result, the coil winding 93 may tumble down.

According to the fuel pump 1 of the first embodiment, however, the winding-start portion and the winding-end portion of the coil winding are held by the first and second holding portions formed in the bobbin. It is, therefore, possible to prevent the winding-start portion and the winding-end portion from being in contact with the main winding portion, including the wire at the intermediate positions. Accordingly, it is possible to avoid a situation that the wire for the coil winding may tumble down.

Each of the inner wall surfaces of the first and second holding portions is formed in the tapered shape in its cross section. According to such shape, it becomes easier to bring the winding-start portion and the winding-end portion to the first and the second holding portions. It is, furthermore, possible to stably hold the winding-start portion and the winding-end portion in the first and second holding portions.

(Second Embodiment)

A fuel pump 2 according to a second embodiment of the present disclosure will be explained with reference to FIGS. 5A and 5B. A shape of a bobbin of the second embodiment differs from that of the first embodiment.

Figure 5A:
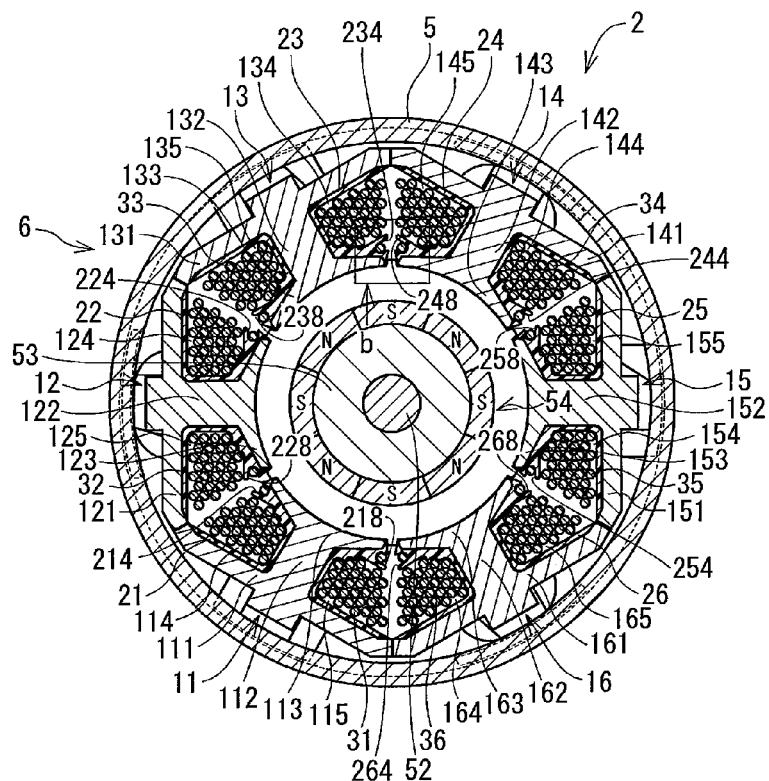
FIG. 5A is a schematic cross sectional view, corresponding to FIG. 3A, showing an electric motor according to a second embodiment of the present disclosure.

FIG. 5A is a schematic cross sectional view showing a motor portion 6 of the fuel pump 2. FIG. 5B is an enlarged view showing a portion indicated by an arrow b in FIG. 5A. As shown in FIG. 5B, the first circumferential forward end 231, which forms the first holding portion 234, is formed in a Y-letter shape. A first inside projection 233, which forms a radial-inside inner wall of the first holding portion 234, is projected in the circumferential direction. An opening portion 27 of the first holding portion 234 is opened in a direction inclined to a radial outward direction. The first inside projection 233 is also referred to as a first radial-inside projection.

In a similar manner, the second circumferential forward end 245, which forms the second holding portion 248, is formed in a Y-letter shape. A second inside projection 247, which forms a radial-inside inner wall of the second holding portion 248, is projected in the circumferential direction. An opening portion 28 of the second holding portion 248 is opened in a direction inclined to a radial outward direction. The second inside projection 247 is also referred to as a second radial-inside projection.

The first inside projection 233 of the bobbin 23 and the second inside projection 247 of the bobbin 24 (neighboring to the bobbin 23) are separated in the circumferential direction by a distance d1, which is smaller than an outer diameter d2 of the wire for the coil windings 33 and 34.

When the core portions 11 to 16, the bobbins 21 to 26 and the coil windings 31 to 36 are molded with the resin to form the stator 10, melting resin moves from a radial outward portion to a radial inward portion of the bobbins, so that a molding pressure is applied to the winding-start portion 331 and the winding-end portion 345, which are respectively held by the first and the second holding portions 234 and 248. In the second embodiment, the circumferential distance d1 between the neighboring first and the second holding portions 234 and 248 is made to be smaller than the outer diameter d2 of the wire for the coil windings 33 and 34. It is, therefore, possible to prevent the winding-start portion 331 and/or the winding-end portion 345 from moving in the radial-inward direction by the molding pressure. Accordingly, in addition to the advantages of the first embodiment, the second embodiment has a further advantage that the winding-start portion 331 and/or the winding-end portion 345 can be prevented from protruding from a resin body after a resin-molding process. In addition, it is possible to prevent corrosion by the fuel and/or insulation failure of the coil windings.

Furthermore, in the second embodiment, the opening portions 27 and 28 of the first and second holding portions 234 and 248 are inclined to the radial-outward direction.

Figure 5B:
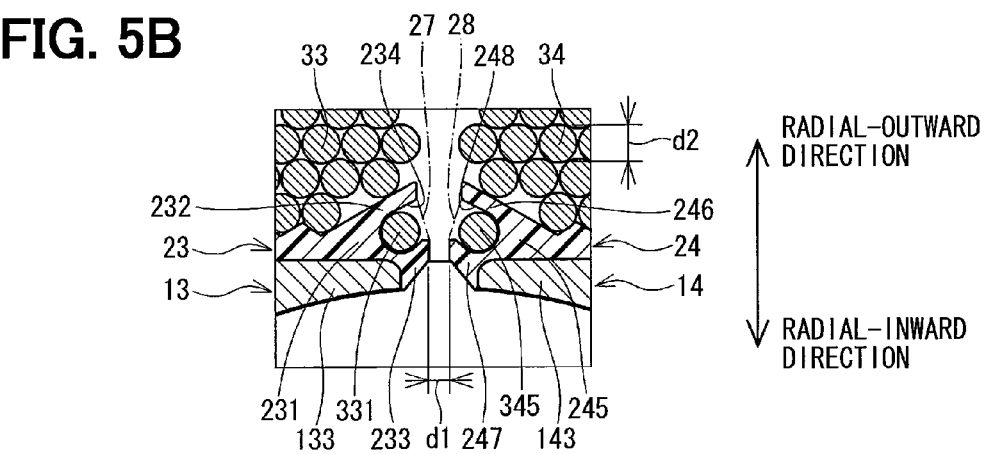
FIG. 5B is a schematic enlarged view showing a portion indicated by an arrow b in FIG. 5A.

According to the above structure, it becomes easier to insert the winding-start portion 331 from the left-hand side in FIG. 5B into the first holding portion 234 and/or to insert the winding-end portion 345 extending from the first winding space to the second winding space into the second holding portion 248. Furthermore, the above structure surely prevents the winding-start portion 331 and/or the winding-end portion 345 from protruding from the resin body (from the holding portions) by the molding pressure.

(Third Embodiment)

A fuel pump 7 according to a third embodiment of the present disclosure will be explained with reference to FIGS. 6A and 6B. A shape of a bobbin of the third embodiment differs from that of the first or the second embodiment.

Figure 6A:
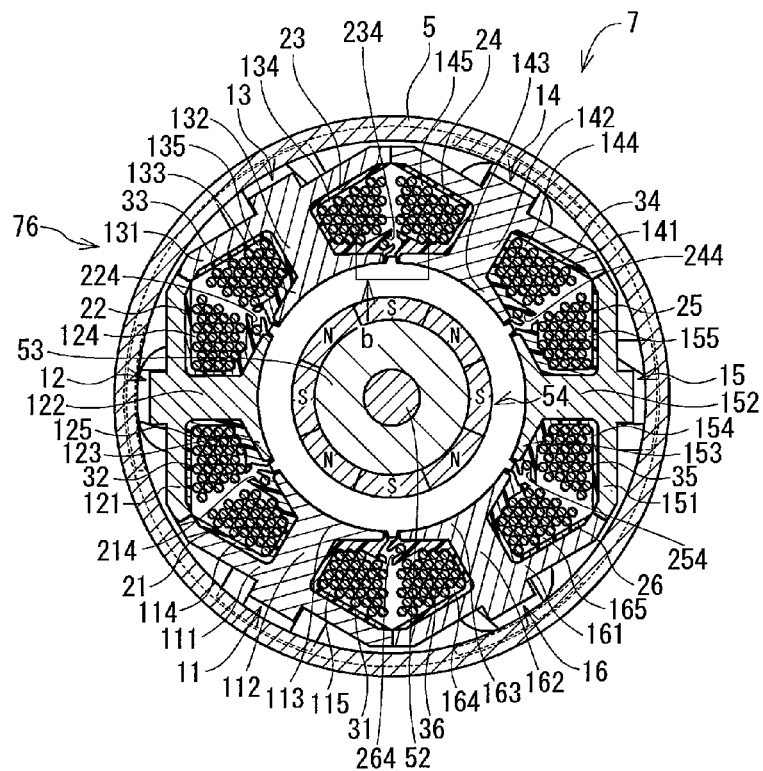
FIG. 6A is a schematic cross sectional view, corresponding to FIG. 3A, showing an electric motor according to a third embodiment of the present disclosure.

FIG. 6A is a schematic cross sectional view showing a motor portion 76 of the fuel pump 7. FIG. 6B is an enlarged view showing a portion indicated by an arrow b in FIG. 6A. As shown in FIG. 6B, the first circumferential forward end 231, which forms the first holding portion 234, is formed in a Y-letter shape. The first inside projection 233, which forms the radial-inside inner wall of the first holding portion 234, is projected in the circumferential direction. An opening portion of the first holding portion 234 is opened in the direction inclined to the radial outward direction, as in the same manner to the second embodiment.

Figure 6B:
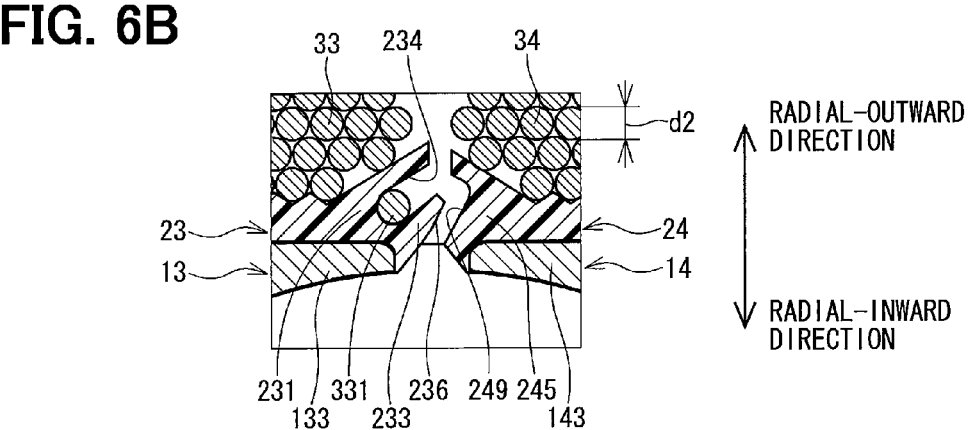
FIG. 6B is a schematic enlarged view showing a portion indicated by an arrow b in FIG. 6A.

As shown in FIG. 6B, the second circumferential forward end 245 of the bobbin 24 is formed in such a shape corresponding to an outer shape of the first circumferential forward end 231. The second circumferential forward end 245 has a radial-inside outer wall surface 249, which is separated from a radial-inside outer wall surface 236 of the first inside projection 233 by a distance smaller than the outer diameter d2 of the wire for the coil windings 33 and 34. However, the distance between the outer wall surfaces 249 and 236 is made as large as possible within a limit of d2. According to such a structure, the melting resin, which moves from the radial outward portion to the radial inward portion of the bobbin, can smoothly pass through the space between the outer wall surfaces 249 and 236.

In the process for winging the coil winding 33, at first, the winding-start portion 331 is held by the first holding portion 234. The wire for the coil winding 33 is then extended to the second winding space 135, wound on the bobbin in the second winding space 135, extended to the first winding space 134 and wound on the bobbin in the first winding space 134. The coil winding 33 is formed by repeating the above winding process. The winding-end portion 335 (not shown in FIG. 6A and 6B) wound in the second winding space 135 is extended from the coil winding 33 to the coil winding 36 (arranged in the stator 10 at the opposite side) by the cross-over wire (not shown) and electrically connected to the coil winding 36.

Electrical potential at the winding-start portion 331 of the coil winding 33 is different from electrical potential at the winding-end portion 335 or the wire at the intermediate positions of the coil winding 34, which is neighboring to the coil winding 33. An electrical short circuit may occur between the neighboring coil windings 33 and 34 due to such difference of the electrical potential. According to the fuel pump 7 of the third embodiment, however, the winding-end portion or the wire of the intermediate positions of the other coil winding is not located in the vicinity of the winding-start portion 331 of the coil winding 33. Accordingly, a sufficient distance can be ensured between the winding-start portion of the coil winding 33 and the neighboring coil winding 34, to thereby prevent the electrical short circuit between them. In addition to the advantages of the second embodiment, the third embodiment has an advantage that a breach of the wire caused by the short circuit can be surely avoided.

According to the third embodiment, the second holding portion (248) is not formed in the second circumferential forward end 245 of the bobbin 24. The second winding space 145 of the bobbin 24 can be made larger, so that a larger number of winding turns can be wound on the bobbin 24.

(Fourth Embodiment)

A fuel pump 8 according to a fourth embodiment of the present disclosure will be explained with reference to FIGS. 7A and 7B. A shape of a bobbin of the fourth embodiment differs from that of the first to third embodiments.

Figure 7A:
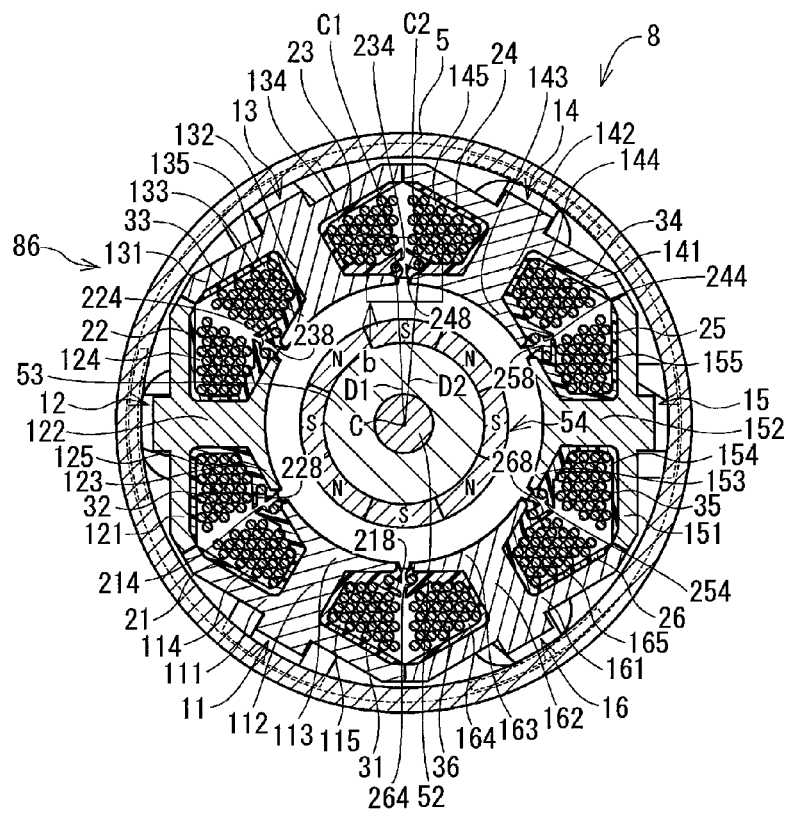
FIG. 7A is a schematic cross sectional view, corresponding to FIG. 3A, showing an electric motor according to a fourth embodiment of the present disclosure.

FIG. 7A is a schematic cross sectional view showing a motor portion 86 of the fuel pump 8. FIG. 7B is an enlarged view showing a portion indicated by an arrow b in FIG. 7A. As shown in FIG. 7B, the first circumferential forward end 231, which forms the first holding portion 234, is formed in the Y-letter shape. In a similar manner, the second circumferential forward end 245, which forms the second holding portion 248, is formed in the Y-letter shape. The second holding portion 248 is formed at a position, which is a further away from the first holding portion 234 in the radial outward direction.

Figure 7B:
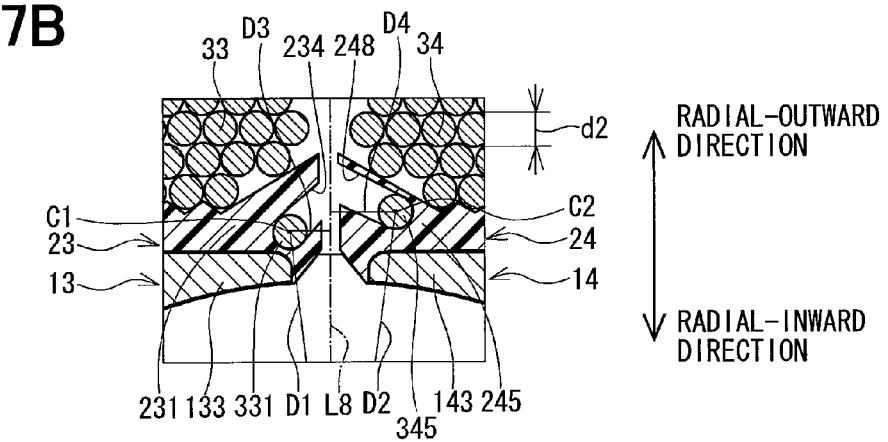
FIG. 7B is a schematic enlarged view showing a portion indicated by an arrow b in FIG. 7A.

In FIG. 7B, C1 is a center of the wire of the winding-start portion 331 held in the first holding portion 234, while C2 is a center of the wire of the winding-end portion 345 held in the second holding portion 248. D1 is a distance (a first distance D1) between a center C of the motor portion 86 (that is, the center of the rotor 50) and the center C1 of the winding-start portion 331, while D2 is a distance (a second distance D2) between the center C of the motor portion 86 and the center C2 of the winding-end portion 345. In the present embodiment, the first distance D1 is made smaller than the second distance D2 in the radial direction. A difference between the first and the second distances D1 and D2 ($\Delta D = D2 - D1$), is made larger than a half of the outer diameter d2 of the wire of the coil windings 33 and 34 ($\Delta D = (D2 - D1) > 1/2 \times d2$).

In addition, a depth of the second holding portion 248 is made larger than that of the first holding portion 234. More exactly, in FIG. 7B, a one-dot-chain line L8 is a virtual line on an intermediate point between the bobbins 23 and 24, D3 is a distance between the center C1 of the winding-start portion 331 and the virtual line L8, and D4 is distance between the center C2 of the winding-end portion 345 and the virtual line L8. In the present embodiment, the distance D3 is made smaller than the distance D4 in the circumferential direction.

In the motor portion 86 of fourth embodiment, the winding-start portion 331 of the coil winding 33 is located at a position, which is displaced from a position of the winding-end portion 345 of the coil winding 34 in the radial direction. In addition, the winding-end portion 345 held in the second holding portion 248 is located at the position, which is substantially separated from the virtual line L8. According to the above structure, a sufficient distance can be ensured between the winding-start portion 331 and the winding-end portion 345, so that the short circuit can be effectively prevented. As above, in addition to the advantages of the second embodiment, the fourth embodiment has an advantage that the breach of the wire caused by the short circuit can be surely avoided.

(Fifth Embodiment)

A fuel pump 9 according to a fifth embodiment of the present disclosure will be explained with reference to FIGS. 8A and 8B. A shape of a bobbin of the fifth embodiment differs from that of the first to fourth embodiments.

Figure 8A:
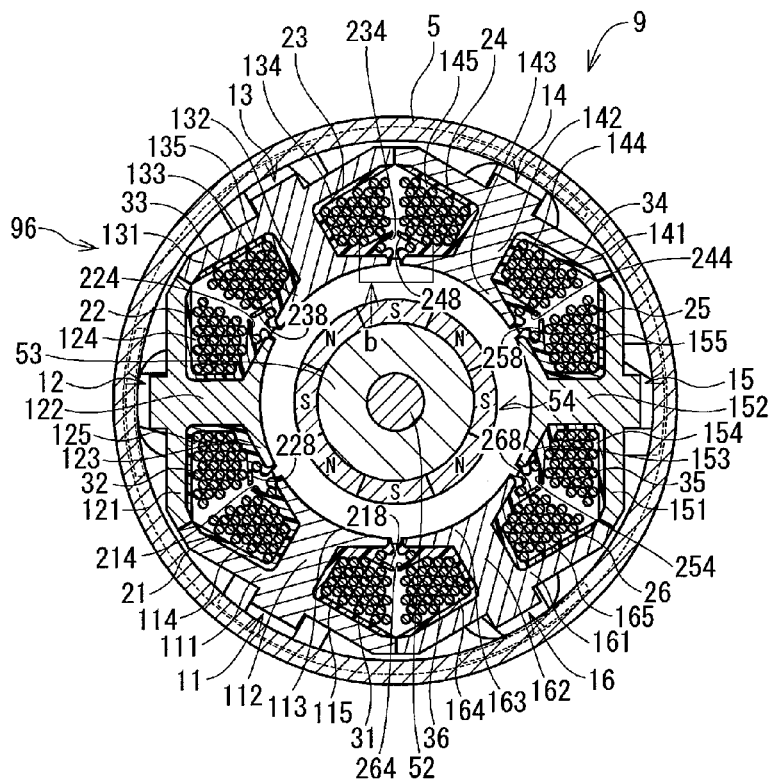
FIG. 8A is a schematic cross sectional view, corresponding to FIG. 3A, showing an electric motor according to a fifth embodiment of the present disclosure.
Figure 8B:
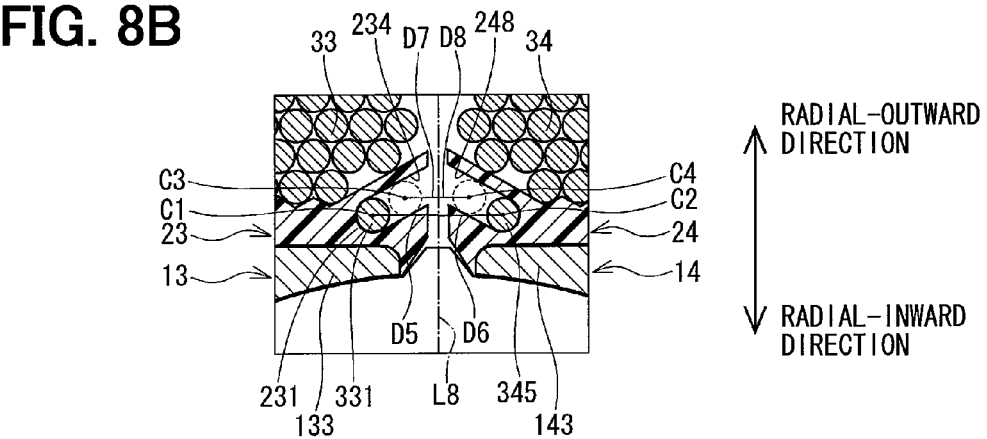
FIG. 8B is a schematic enlarged view showing a portion indicated by an arrow b in FIG. 8A.

FIG. 8A is a schematic cross sectional view showing a motor portion 96 of the fuel pump 9. FIG. 8B is an enlarged view showing a portion indicated by an arrow b in FIG. 8A. In the fifth embodiment, the recessed portion of the first holding portion 234 for holding the winding-start portion 331 is made deeper than that of the second embodiment. In other words, according to the fifth embodiment, the winding-start portion 331 held by the first holding portion 234 is located at such a position, which is deeper than that of the second embodiment. More in detail, in FIG. 8B, the one-dot-chain line L8 is the virtual line on the intermediate point between the bobbins 23 and 24. D5 is a distance in the circumferential direction between the virtual line L8 and the center C1 of the wire of the winding-start portion 331 in the present embodiment. D7 is a distance in the circumferential direction between the virtual line L8 and a virtual center C3 of the wire of the winding-start portion 331 in the second embodiment. In the present fifth embodiment, the distance D5 is made larger than the distance D7.

In a similar manner, the recessed portion of the second holding portion 248 for holding the winding-end portion 345 is made deeper than that of the second embodiment. Namely, according to the fifth embodiment, the winding-end portion 345 held by the second holding portion 248 is located at such a position, which is deeper than that of the second embodiment. More in detail, in FIG. 8B, D6 is a distance in the circumferential direction between the virtual line L8 and the center C2 of the wire of the winding-end portion 345 in the present embodiment. D8 is a distance in the circumferential direction between the virtual line L8 and a virtual center C4 of the wire of the winding-end portion 345 in the second embodiment. In the present fifth embodiment, the distance D6 is made larger than the distance D8.

According to the motor portion 96 of the above structure, since a sufficient distance can be ensured between the winding-start portion 331 of the coil winding 33 and the winding-end portion 345 of the coil winding 34, the short circuit can be effectively prevented. As above, in addition to the advantages of the second embodiment, the fifth embodiment has an advantage that the breach of the wire caused by the short circuit can be surely avoided.

(Further Embodiments and/or Modifications)

(1) In the above embodiments, the brushless motor is used in the motor portion. However, any kinds of electric motors can be used.

(2) In the above embodiments (except for the third embodiment), the first and second holding portions 234 and 248 are formed in the bobbins for respectively holding the winding-start portion 331 and the winding-end portion 345. However, only either one of the first and the second holding portions may be formed.

(3) In the above embodiments, each of the first and the second holding portions 234 and 248 is formed in the bobbin so as to continuously extend in the axial direction from the upper end of the bobbin (on the side to the fuel outlet port 41) to the lower end of the bobbin (on the side to the fuel inlet port 61). The shape of the first and the second holding portions is not limited to the above structure. Each of the first and the second holding portions 234 and 248 may be formed only at the upper end and the lower end of the bobbin. In other words, the holding portion may not be formed in a middle portion of the bobbin between the upper end and the lower end.

(4) In the above first embodiment, one projection 232 is formed at the circumferential forward end 231. In the second embodiment, two projections (the radial-outside projection 232 and the radial-inside projection 233) are formed at the first circumferential forward end 231. A number of the projections is not limited to the above one or two.

(5) In the above fourth embodiment, the difference between the first and the second distances D1 and D2 is made larger than the half of the outer diameter d2 of the wire of the coil windings. The difference of the distances is not limited to the above condition. The difference of the distances D1 and D2 may be smaller than the half of the outer diameter of the wire.

The present disclosure should not be limited to the above embodiments and/or modifications but can be further modified in various manners without departing from the spirits of the present disclosure.

What is claimed is:

1. An electric motor comprising:
   a stator for generating a rotating magnetic field when electric power is supplied to the stator; and
   a rotor movably provided in a radial inside space of the stator so as to oppose to the stator, the rotor having a magnet in which different magnetic poles are alternately formed in a circumferential direction, and the rotor being rotated by the rotating magnetic field generated by the stator,
   wherein the stator includes:
   multiple core portions made of magnetic material;
   multiple coil windings, each of which is wound on the respective core portion, each of the coil windings having a winding-start portion and a winding-end portion; and
   multiple bobbins, each of which is provided at the respective core portion so as to electrically insulate the respective core portion from the respective coil winding,
   wherein each of the bobbins has a first circumferential forward end and a second circumferential forward end, which are formed at radial-inside portions of the bobbin and extend in circumferentially opposite directions of the stator,
   wherein each of the bobbins has at least one of a first holding portion formed at the first circumferential forward end for holding the winding-start portion and a second holding portion formed at the second circumferential forward end for holding a winding-end portion,
   wherein the first holding portion is radially shifted relative to the second holding portion such that a first distance between a center of the rotor and a center of the winding-start portion is different from a second distance between the center of the rotor and a center of the winding-end portion by the second holding portion,
   wherein the first circumferential forward end has a first radial-inside projection forming a radial-inside inner wall of the first holding portion,
   wherein the second circumferential forward end has a second radial-inside projection forming a radial-inside inner wall of the second holding portion, and
   wherein a distance in the circumferential direction between the first radial-inside projection of the bobbin and the second radial-inside projection of a neighboring bobbin is smaller than an outer diameter of a wire for the coil winding.

2. The electric motor according to claim 1, wherein
   each of the coil windings has the winding-start portion, the winding-end portion and a main winding portion between the winding-start portion and the winding-end portion, and one of the first and second holding portions is formed in the bobbin at a position at which the winding-start portion or the winding-end portion is not brought into contact with the main winding portion.

3. The electric motor according to claim 1, wherein each of the bobbins has the first holding portion and the second holding portion,
the first holding portion holds the winding-start portion, and
the second holding portion holds the winding-end portion.

4. The electric motor according to claim 3, wherein the first holding portion has a recessed portion for holding the winding-start portion and the second holding portion has a recessed portion for holding the winding-end portion, and
a depth of the recessed portion of the first holding portion is different from a depth of the recessed portion of the second holding portion in the circumferential direction of the stator.

5. The electric motor according to claim 1, wherein a difference between the first distance and the second distance is larger than a half of an outer diameter of the wire of the coil winding.

6. The electric motor according to claim 1, wherein the first circumferential forward end has a first radial-outside projection extending in the circumferential direction for forming a radial-outside inner wall of the first holding portion,
the second circumferential forward end has a second radial-outside projection extending in the circumferential direction for forming a radial-outside inner wall of the second holding portion, and
the circumferential direction of the second radial-outside projection is opposite to the circumferential direction of the first radial-outside projection.

7. The electric motor according to claim 1, wherein the first holding portion has a recessed portion for holding the winding-start portion and the second holding portion has a recessed portion for holding the winding-end portion, and
each inner wall surface of the first and the second holding portions is formed in a tapered shape in its cross section.

8. The electric motor according to claim 1, wherein the first holding portion has a recessed portion for holding the winding-start portion and the second holding portion has a recessed portion for holding the winding-end portion, and
each opening portion of the first and the second holding portions is opened in a direction inclined to a radial outward direction of the stator.

9. The electric motor according to claim 1, wherein the electric motor is a brushless motor.

10. A fuel pump for a vehicle, which is provided in a fuel tank of the vehicle, for sucking fuel from the fuel tank and discharging the fuel to an engine, the fuel pump comprising:
the electric motor defined in claim 1;
a pump portion having a rotating member, which is connected to the rotor of the electric motor and pressurizes the fuel;
a fuel inlet port for sucking the fuel from the fuel tank and supplying the fuel to the pump portion; and
a fuel outlet port for discharging the fuel pressurized by the pump portion.

11. The electric motor according to claim 1, wherein the first holding portion is Y-shaped to have a first opening,
the second holding portion is Y-shaped to have a second opening,
the first opening is radially shifted relative to the second opening to face the second holding portion, and
the second opening is radially shifted relative to the first opening to face the first holding portion.

12. An electric motor comprising:
a stator for generating a rotating magnetic field when electric power is supplied to the stator; and
a rotor movably provided in a radial inside space of the stator so as to oppose to the stator, the rotor having a magnet in which different magnetic poles are alternately formed in a circumferential direction, and the rotor being rotated by the rotating magnetic field generated by the stator,
wherein the stator includes:
multiple core portions made of magnetic material, each of the core portions having an outer flange portion, an inner flange portion and a connecting portion;
multiple coil windings, each of which is wound on the respective core portion, each of the coil windings having a winding-start portion and a winding-end portion; and
multiple bobbins, each of which is provided at the respective core portion so as to electrically insulate the respective core portion from the respective coil winding,
wherein each of the bobbins has a first circumferential forward end and a second circumferential forward end, wherein the first and the second circumferential forward ends cover the inner flange portion of the core portion and are arranged at opposite sides of the inner flange portion in the circumferential direction of the stator,
wherein a first holding portion is formed at the first circumferential forward end for holding the winding-start portion,
wherein a second holding portion is formed at the second circumferential forward end for holding the winding-end portion,
wherein the first holding portion is radially shifted relative to the second holding portion such that a first distance between a center of the rotor and a center of the winding-start portion is different from a second distance between the center of the rotor and a center of the winding-end portion by the second holding portion,
wherein the first circumferential forward end has a first radial-inside projection for forming a radial-inside inner wall of the first holding portion,
wherein the second circumferential forward end has a second radial-inside projection forming a radial-inside inner wall of the second holding portion, and
wherein a distance in the circumferential direction between the first radial-inside projection of the bobbin and the second radial-inside projection of a neighboring bobbin is smaller than an outer diameter of the wire for the coil winding.

* * * * *